Jan. 16, 1951 F. W. HOLT, JR., ET AL 2,538,520
APPLICATION OF THERMOPLASTIC TAPE
Filed July 19, 1948 4 Sheets-Sheet 2
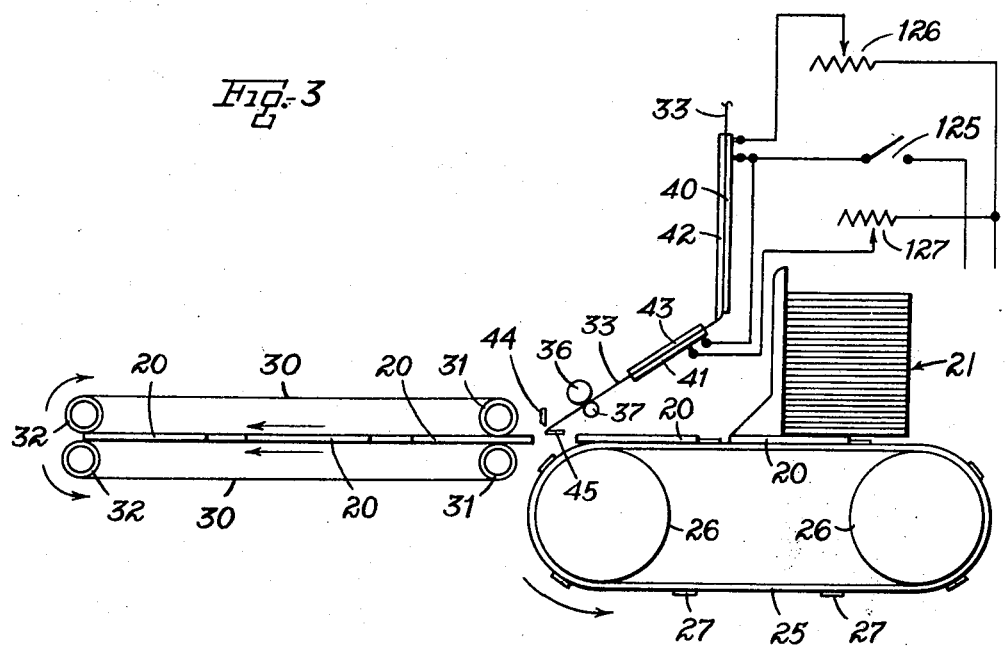
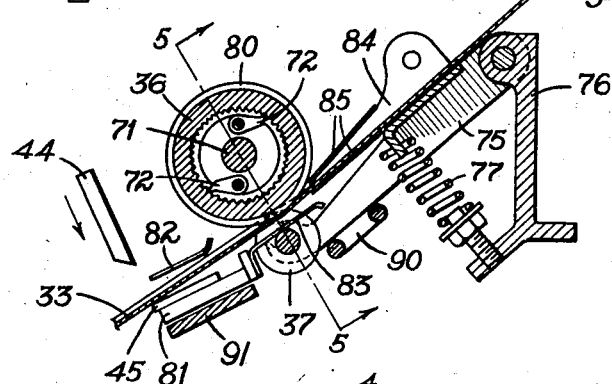
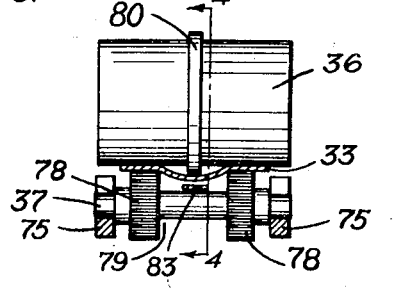
INVENTORS
Frederick W. Holt Jr.
Charles T. Howard
David C. Bapak
BY
Marcelo Giabal
ATTORNEYS

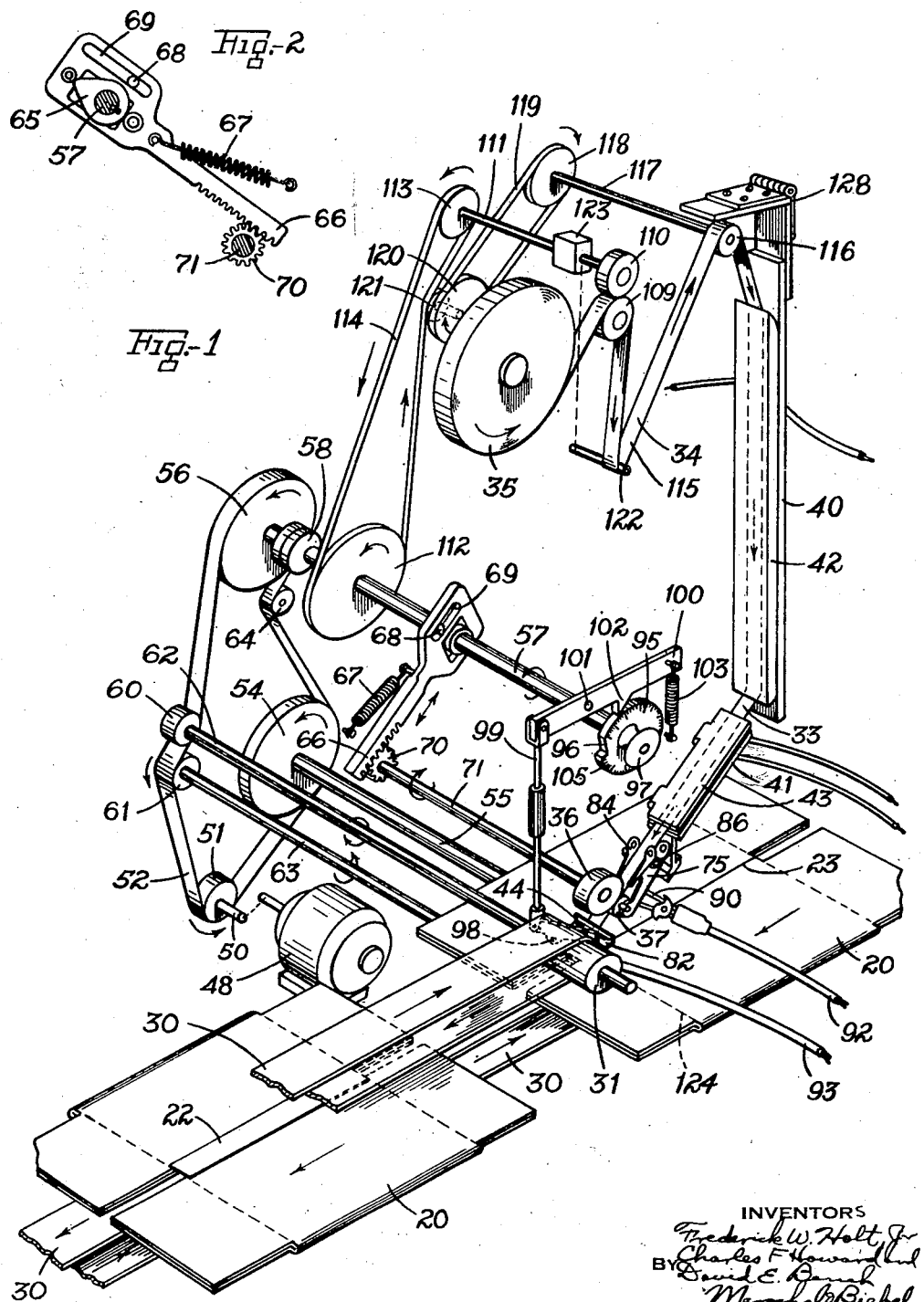

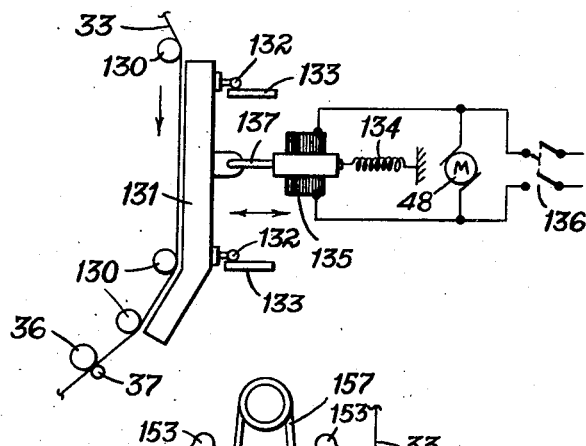
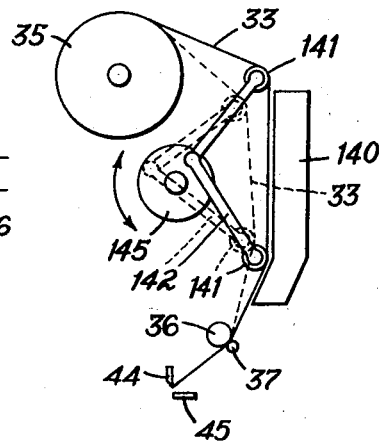
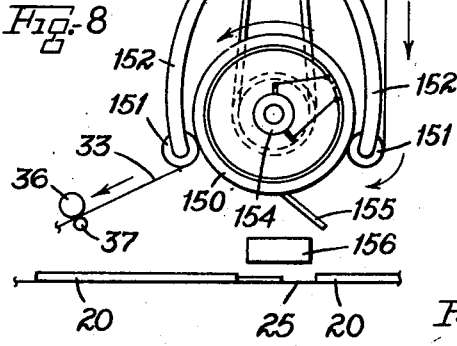
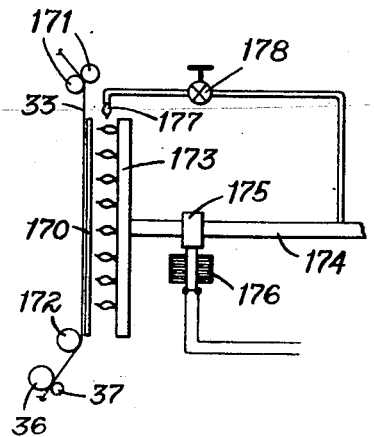
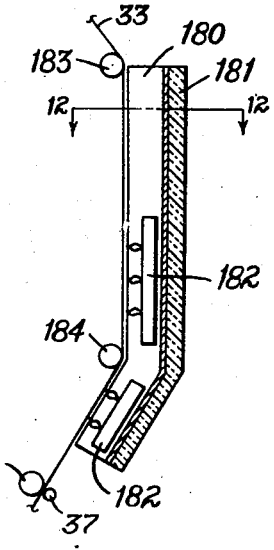
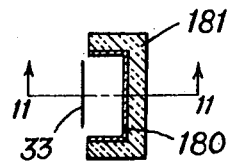

Jan. 16, 1951 F. W. HOLT, JR., ET AL 2,538,520
APPLICATION OF THERMOPLASTIC TAPE
Filed July 19, 1948 4 Sheets-Sheet 4
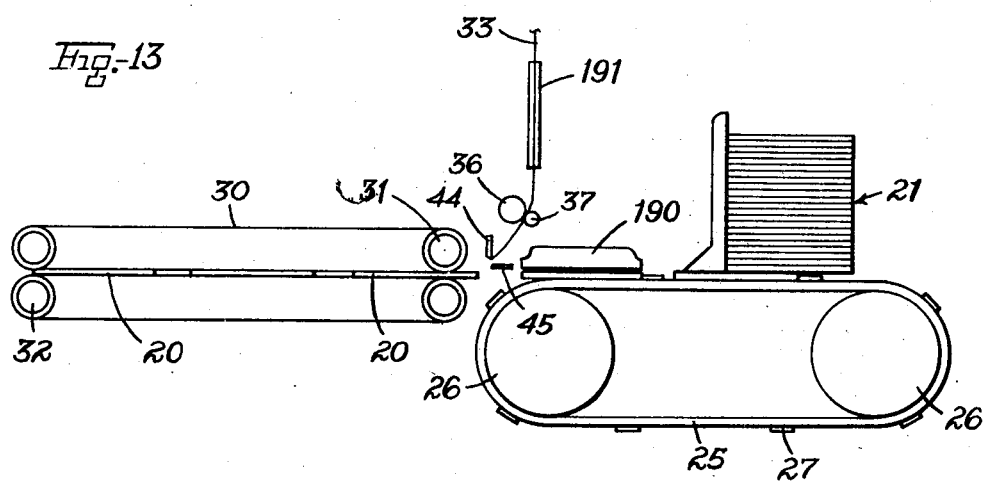
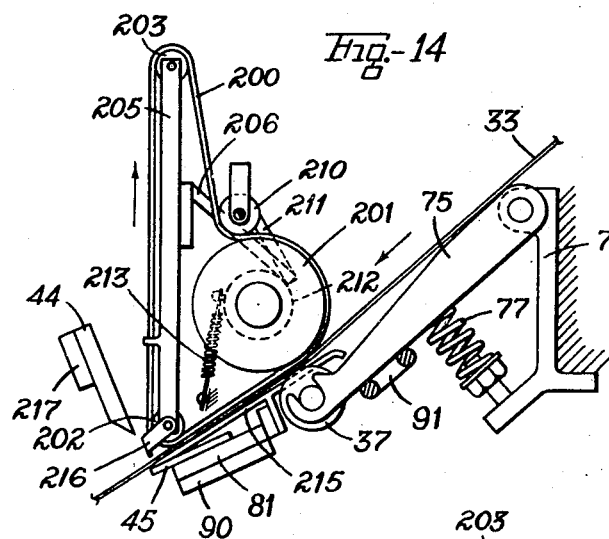
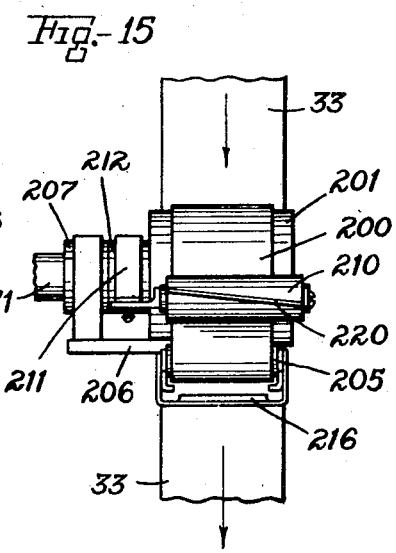
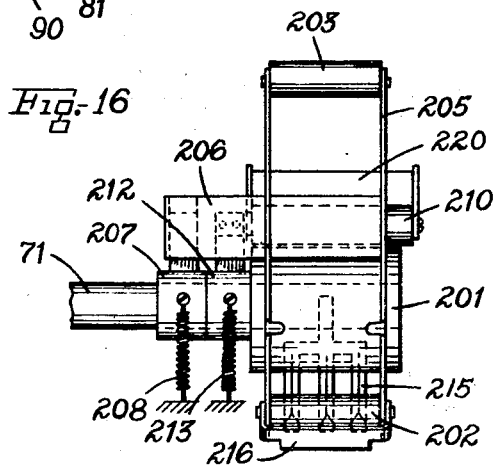
INVENTORS
Frederick W. Holt, Jr.,
Charles T. Howard and
David E. Bonnet
BY
Marechal & Biebel
ATTORNEYS Patented Jan. 16, 1951

2,538,520

UNITED STATES PATENT OFFICE 2,538,520

APPLICATION OF THERMOPLASTIC TAPE

Frederick W. Holt, Jr., Troy, Charles F. Howard, Dayton, and David E. Bench, Trotwood, Ohio, assignors to The Brown-Bridge Mills, Inc., Troy, Ohio, a corporation of Ohio Application July 19, 1948, Serial No. 39,546

22 Claims. (Cl. 216—30)

This invention relates to the application of sealing tape having a thermoplastic adhesive coating thereon.

The invention is directed particularly to continuous taping operations such as the production of cartons from corrugated board or like operations wherein the tape having a thermoplastic coating thereon is applied from a roll or other continuous supply source to successive articles having joints or other surface portions requiring sealing or reinforcement. In contrast with the carrying out of such operation with tape having a water soluble adhesive coating, the use of tape coated with a thermoplastic adhesive resistant to moisture offers substantial advantages of greater strength and increased utility in service.

One of the principal objects of the present invention is to provide simple and reliable apparatus for applying tape coated with a thermoplastic adhesive to successive articles to be sealed in which the coated tape is fed from a continuous supply source and predetermined lengths thereof are applied to successive articles traveling through the apparatus at relatively high speed to give a correspondingly high production rate.

Another object is to provide such apparatus wherein the feeding and application of the tape are carried out under controlled heating conditions assuring proper softening of the adhesive and proper adhesion of the tape to the articles to be sealed without objectionable accumulation or deposit of the adhesive material in or on the apparatus.

An additional object is to provide such apparatus which will operate satisfactorily with tape having a thermoplastic layer coated directly thereon and also with tape which includes a layer of asphaltic or other heat-sensitive material in addition to the thermoplastic adhesive coating.

It is also an object of the invention to provide a method of taping successive blanks or other articles at high speed with tape having a thermoplastic adhesive coating in which the tape is fed from a continuous supply source and predetermined lengths thereof are applied to successive articles to be sealed under controlled heating conditions assuring proper adhesion without burning or charring of the adhesive material or accumulation thereof on other surfaces.

Another object is to provide such a method and apparatus in which successive areas of the tape fed from a continuous supply source are subjected to heat substantially higher than the softening range of the adhesive coating thereon while traveling at high speed to effect rapid softening of the coating without charring or burning, and in which the heated tape is guided into sealing relation with the surfaces to be sealed primarily from the uncoated side thereof to minimize premature cooling of the adhesive and deposit thereof on other surfaces.

Still another object is to provide apparatus and a method for the application of tape coated with a thermoplastic adhesive wherein the heated tape is warped longitudinally thereof to impart stiffness facilitating proper control of the leading end thereof and also to minimize contact between the softened coating thereon and the feeding and guiding portions of the apparatus.

Other objects and advantages of the invention will be apparent from the following description, the accompanying drawings and the appended claims.

In the drawings—

Fig. 1 is a diagrammatic view in the nature of a perspective showing tape applying apparatus in accordance with the invention;

Fig. 2 is a detail view showing the cam and rack for actuating the tape feeding rolls;

Fig. 3 is a diagrammatic side view illustrating the operation of the apparatus of Fig. 1;

Fig. 4 is an enlarged fragmentary view showing the tape feeding and cutoff mechanism, the view being in section on the line 4—4 of Fig. 5;

Fig. 5 is a detail section substantially on the line 5—5 of Fig. 4;

Fig. 6 is a fragmentary diagrammatic view showing a modified construction of heating mechanism for softening the adhesive coating on the tape;

Fig. 7 is a view similar to Fig. 6 showing another form of electric heating mechanism;

Fig. 8 is another view similar to Fig. 6 showing a further modified construction of electric heating mechanism;

Fig. 9 is a fragmentary view in horizontal section showing still another modified arrangement of electric heating unit;

Fig. 10 is a view similar to Fig. 6 showing a gas heating unit for softening the adhesive coating on the tape;

Fig. 11 is a view in vertical section showing another form of gas heating unit, the view being in section on the line 11—11 of Fig. 12;

Fig. 12 is a section on the line 12—12 of Fig. 11;

Fig. 13 is a view similar to Fig. 2 showing another arrangement of tape applying apparatus wherein heat is applied to the surface of the blanks to be sealed;

Fig. 14 is a fragmentary view in side elevation similar to Fig. 4 and showing a modified construction of tape feeding mechanism embodying a belt;

Fig. 15 is a top view of the tape feeding mechanism of Fig. 14; and

Fig. 16 is a front view of the mechanism of Fig. 14 with the belt removed.

Referring to the drawings, which illustrate preferred embodiments of the invention, Figs. 1 and 3 show somewhat schematically apparatus for performing a continuous taping operation in which each successive folded carton blank 20 of corrugated board from a supply stack 21 has a strip 22 of thermoplastic adhesive tape applied to the joint 23 formed by the meeting edges of the panel portions which form the sides of the finished carton, the tape 22 thus sealing the sides of carton blank with the ends of the blank remaining open for subsequent assembly in the usual way. An endless conveyor 25 running over spaced rolls 26 is provided with spaced feed bars 27 for conveying successive blanks 20 from the stack 21 to a pair of opposed upper and lower pressure belts 30 running over two pairs of rolls 31 and 32. The web of tape 33 has the adhesive coating 34 on its lower surface, and it is fed from a continuous supply roll 35 by a pair of feed rolls 36 and 37 at a rate coordinated with the travel of blanks 20 so that the leading end of the tape web meets each successive blank at the nip of belts 30 in proper registry with the leading end of the joint 23 to be sealed.

Electric heating elements 40 and 41 located between the supply roll 35 and the feed rolls 36 and 37 provide for heating and thus softening the coating on the tape so that it is in sealing condition as delivered to the nip of the pressure belts, the tape passing over heaters 40 and 41 with its coated surface held in wiping contact with the heaters by means of pressure elements or shoes 42 and 43, respectively. As the tape and blank are pressed together at the nip of the pressure rolls, they are drawn forward in sealing contact by the movement of belts 30, and cooperating cutoff knives 44 and 45 form the blades of shears for severing the tape after the proper predetermined length has passed equal to the length of the strip to be applied to joint 23.

The drive for the apparatus is provided from a motor or other power source indicated diagrammatically at 48 to a drive shaft 50, which carries a pulley or sprocket 51. A belt or chain 52 transmits the drive to a pulley or sprocket 54 on the shaft 55 carrying the forward conveyor roll 26, and the drive is similarly transmitted to a pulley or sprocket 56 which drives the cam shaft 57 through a releasable clutch 58. The belt or chain 52 similarly drives the pulleys or sprockets 60 and 61 on the shafts 62 and 63 respectively which carry the rolls 31 for pressure belts 30, the tension of belt 52 being controlled by an idler 64. It will also be noted that the wheels 54, 60 and 61 are of different relative sizes in accordance with the diameters of the rolls 26 and 31 to properly correlate the linear speeds of the conveyor 25 and belts 30.

Cam shaft 57 carries a cam 65 (Fig. 2) which operates a reciprocable rack 66 against a spring 67, the rack being guided by a roller 68 in slot 69. The toothed portion of the rack is in mesh with a pinion 70 on the shaft 71 which carries the upper feed roll 36, and a one-way ratchet drive is provided between shaft 71 and feed roll 36, as shown at 72 in Fig. 4, providing for driving positively only in the direction to advance the tape. The lower feed roll 37 is mounted in a holder 75 pivoted to a bracket portion 76 of the main frame and provided with a spring 77 arranged to urge the holder resiliently upwardly to position the feed rolls in driving contact with each other. As shown in Fig. 5, the lower feed roll 37 is spool-shaped and includes two knurled half-portions 78 which engage the coated side of the tape and which are separated by a circumferential groove 79 to minimize contact between the surface of the roll and the tape.

It will be noted that the action of these feed rolls is to feed the leading end of the tape towards the nip of the pressure belts 30. Improved control is obtained over this free leading end of the tape by warping or curling the tape longitudinally to increase its stiffness. This is obtained by means of a circumferential rib 80 on the upper feed roll 36, which engages in groove 79 and cooperates with the lower feed roll 37 to impart the desired curved cross-sectional configuration to the tape. The warping of the tape also has the effect of lifting the side edges thereof to reduce the area of contact between the coated surface and the lower knife blade 45 and its holder 81, thus minimizing deposit of the softened coating material on these parts.

The leading end of the tape is guided towards the cutoff knife and the pressure belts by a tongue or upper guide member 82 mounted between feed roll 36 and the upper knife 44, and also a lower guide finger 83 is secured to the holder 81 and extends rearwardly into the slot 79 in the lower feed roll. Lateral guiding of the tape is provided by a pair of guide fingers 84 (Fig. 4) having their upper and lower edges turned inwardly at 85 to engage the edges of the tape. The guide fingers 84 are adjustably mounted on the holder 75 for the lower feed roll by brackets 86 for lateral adjustment in accordance with the width of the tape.

It will be noted that the lower feed roll and its holder 75, and also the lower knife 45, come in contact with the softened coating on the tape, and if these parts are at a materially lower temperature than the coating, the adhesive material may be chilled and hardened thereby and may tend to build up a considerable deposit on these parts. This also has a tendency to impede the proper feeding of the leading edge of the tape beyond the feed rolls, and if this occurs, the tape is likely to loop and pile up between the feed rolls and the knife, fouling the apparatus and requiring that it be stopped for cleaning. This condition may be controlled by the application to these parts of a suitable lubricant such as a mold release fluid of the type used in plastic molding operations to prevent adhesion to the sides of a metal mold. The fluid may be readily applied by a brush, spray or the like before operation of the apparatus is started and intermittently thereafter as the need therefor may occur, and if a deposit does form, it will be found to be more readily removable than from untreated parts.

The deposit of adhesive on the feeding and cutoff mechanism may also be controlled within desired limits by the provision of heating means for these parts. As shown in Fig. 4, an electrical heating element 90 is mounted on the underside of the holder 75 to heat the latter and the lower feed roll 37, and another heater 91 is similarly mounted in contact with the holder 81 for knife 45, the respective supply wires for these heaters being indicated at 92 and 93 in Fig. 1, suitable variable controls being provided for the 'ndividual heater elements. With electric heaters arranged as shown, heat is conducted to the feed roll 37 and knife 45, and also considerable heat is stored in the holders 75 and 81, thus readily maintaining the parts actually in contact with the tape within a desired temperature range. Gas flame heaters have also been used successfully in place of electric heaters 90 and 91.

Satisfactory results have been obtained with the knife and feed roll at a temperature such that the adhesive remains fluid and acts as its own lubricant, and the movement of the tape across these parts is effective to wipe away any excess deposit and thus to hold the accumulation to a thin film of substantial constant thickness. This wiping action is particularly effective at the cutting edge of the knife 45, where the tape bears with considerable pressure as it is being pulled forward by the pressure belts 30, thus minimizing transfer of adhesive to the upper blade during the cutoff stroke and similarly minimizing the tendency of the upper blade to lift the end of the tape as it returns to its upper position.

The cutoff operation is effected by the cam shaft 57, which operates the upper knife 44 by means of an adjustable cam 95 (Fig. 1) having a drop-off notch 96. A locking member 97 releasably secures cam 95 to shaft 57 to provide for adjustment thereof on the shaft. The knife 44 is pivotally mounted at 98, and the lower end of a rod 99 is connected thereto at the opposite side of pivot 98 from the blade portion of the knife. The upper end of rod 99 is connected to a cam lever 100 pivotally mounted at 101 and provided with a cam follower 102 for cam 95. A spring 103 is secured to the opposite end of lever 100 from rod 99 in position to rock the lever on pivot 101 in clockwise direction as viewed in Fig. 1. Thus when the cam follower 102 drops into the notch 96 as cam 95 revolves, lever 100 will rock and cause the knife 44 to rock on pivot 98 and execute a shearing stroke with respect to knife 45. The adjustable mounting of cam 95 provides for pre-setting to effect the cutoff at a desired point in the cycle in accordance with the length of the tape to be applied to each blank 20, the cam being shown as provided with calibrations 105 in terms of the length of tape to be cut off.

A pre-feeding assembly is provided for the tape between the supply roll 35 and the first heater 40. The tape passes from the supply roll to a pair of feed rolls 109 and 110, the latter being on a shaft 111 driven from cam shaft 57 by pulleys or sprockets 112 and 113 and a belt or chain 114. The tape then passes in a loop 115 to a roller 116 on a shaft 117 carrying a pulley or sprocket 118 driven through belt or chain 119 by a pulley or sprocket 120 on a common shaft with a pulley or sprocket 121 which is in driven engagement with the belt or chain 114. A follower or rider bar 122 is supported by loop 115 and is connected with driven roll 110, as indicated diagrammatically at 123, to vary the pressure between rolls 109 and 110 inversely in accordance with the length of loop 115 and thus to maintain the feed to rolls 36—37 at a substantially constant rate. From roll 116, the tape passes to the spaces between the heaters 40 and 41 and pressure shoes 42 and 43, and it is drawn through in contact with the heaters by the feed rolls 36 and 37 and the pressure belts 30 as already described.

In operation, the movement of the tape as effected by the feed rolls is coordinated with the movement of the blanks 25 at the start of the operation so that the leading end of the tape reaches the nip of pressure belts 30 in proper registry with the leading end of the joint 23 to be sealed, and the relative speeds of the tape and blanks is such that one blank is taped during each revolution of the cam shaft 57. Also the cam 95 is initially adjusted and synchronized with the conveyor 25 in accordance with the dimensions of the blanks 20 and the length of the joint 23 to operate the cutoff knife at the proper instant in each cycle to cut off a length of tape equal to the length of joint 23, these relative adjustments being readily carried out while the clutch 58 on cam shaft 57 is disengaged.

In a typical operation, starting with the parts in the relative positions indicated in Fig. 3, the cam 65 will operate rack 66 at the proper instant to move upwardly against spring 67 and thus to drive feed rolls 36—37 and effect advance of the leading end of the tape to meet the approaching blank 20 in registry with the crease 124 at the leading end of joint 23. The feed rolls drive the tape until its leading end is well within the pressure belts, and then as cam 65 passes its high point and rack 66 moves downwardly under the urging of spring 67, the upper feed roll 36 overruns ratchet 72 as a result of the pull on the tape from the moving pressure belts, thus permitting the rack and shaft 71 to return to their proper positions for the next feeding stroke. This action is continued until the predetermined proper length of tape has run past the upper cutoff knife, and then cam 95 operates the knife as already described to sever the tape.

It will be apparent that the feeding of the tape is intermittent, with a dwell period occurring just after each cutoff stroke, and also that the length of tape between heater 41 and the knife which has already been heated is thus stationary for an appreciable interval and the coating thereon should accordingly be heated sufficiently to prevent setting before application to a blank. The provision of a plurality of separately controllable heaters 40 and 41 facilitates control over the heating conditions to assure adequate softness in the adhesive as the tape is delivered to successive blanks. Thus heaters 40 and 41 are shown in Fig. 3 as separately energized through individual circuits having a common main switch 125 and each containing a variable resistor 126 and 127 providing for selective control of the two heaters. Since the tape moves relatively rapidly past the heaters, the temperature and length of the heating surfaces should be sufficient to effect rapid softening of the adhesive coating, and desirable results have been obtained from this standpoint with the heating surfaces at a temperature substantially above the softening range of the adhesive, thus reducing the effective length required for the heating surfaces.

The particular heating conditions are dependent upon the particular adhesive being employed in the coating on the tape as well as the speed at which the apparatus is operated, an adhesive being satisfactory which will soften rapidly at a temperature obtainable in the apparatus with an economical heat input and which will set rapidly to hold the tape and blank firmly together. An example of one satisfactory composition for use with this apparatus is composed of 4% by weight of a paraffin wax having a melting point of 135° F. and 96% by weight of a resin manufactured by General Mills under the designation "#94 Polyamide Resin" and consisting of the reaction product of dimerized and trimerized linoleic and linolenic acids of soybean oil with ethylene diamine, this resin having an average molecular weight of 3000 to 6500 and a softening point of 212–220° F. This composition has a softening range of 170–180° F., and it is readily applied to the tape as a hot melt in the initial coating of the tape.

Another example of a satisfactory composition for use with this apparatus has the following formula

| | Percent by weight |
|---|---|
| Ethyl cellulose (22 c. p. s. 46.8–48.5% ethoxyl) (Hercules Powder Co.) | 49.5 |
| Dibutyl phthalate | 15.0 |
| Stearic acid | 35.0 |
| Ortho-tolylbiguanide | .5 |

This composition has an effective softening point of 150° F. and it is readily applied initially to the tape in a solution from which the solvent is then evaporated, a suitable solvent being trichloroethylene or a mixture of toluene and ethyl alcohol.

As an example of typical operating conditions for the apparatus, successful results have been obtained with a paper or cloth tape two inches wide coated with the first of the above compositions, the weight of the coating being 10 pounds per 3000 square feet of tape. In this example, the upper heater 40 was composed of a pair of strip heaters arranged in side by side relation, each having a rated wattage of 750 watts and each having a flat chromium-steel heating surface 1½ inches wide and 19½ inches long. The lower heater 41 was similarly composed of a pair of strip heaters arranged in side by side relation, each rated at 350 watts and each having a flat porcelain heating surface 1½ inches wide and 7¾ inches long, and the air line distance from the lower end of heater 41 to knife 44 being approximately 10 inches. The heater 90 was a 500-watt tubular radiant heater in hairpin form, and heater 91 was a 250-watt contact heater brazed to the under side of the holder 81 for the lower knife blade 45.

In this example, with the apparatus operating at a linear speed of 400 feet per minute for the blanks 20 and conveyor 25, and with the tape applied to 120 blanks per minute at an average rate of travel of 200 linear feet per minute, satisfactory softening of the coating and adhesion to the blanks has been obtained with the heaters 40 and 41 at surface temperatures of approximately 780° F. and 740° F. respectively. Each portion of the tape was accordingly in contact with the heaters for approximately ⅓ second while in motion plus a dwell period of approximately ¼ second, the latter also being a cooling period for the leading 10 inches of the tape. Adequate setting of the tape was obtained with a travel time of approximately 2.7 seconds for each blank between pressure belts 30. Proper control of the feeding of the tape and freedom from accumulation of adhesive on the feeding and cut-off mechanism in this example was obtained with the heaters 90 and 91 operating at sufficient capacity to heat the lower knife blade 45 and the feed roll 37 to a temperature such that the adhesive is fluid, for example 250° F. This lower temperature for the feeding and cutoff mechanism has been found to give adequate lubrication and self-cleaning of the parts without the danger of charring or scorching the adhesive or tape while the latter is not in motion. It will be apparent that with other adhesives having lower softening points, lower temperatures may be employed in all the heaters.

It is desirable to provide means for discontinuing the application of softening heat to the tape when the apparatus stops in order to prevent overheating of the tape in contact with the heaters. Thus as shown in Fig. 1, the heater 40 is hinged at 128 for ready swinging movement away from the pressure element 42 and out of contact with the tape, and a similar arrangement may be readily provided for the heater 41 and pressure element 43. Fig. 6 shows a simple and effective arrangement for automatically separating the heater from the tape when the apparatus stops.

In Fig. 6, the tape 33 is shown as running over three guide rolls 130, and a heating unit 131 is mounted for movement towards and away from the tape by means of rollers 132 on suitable supporting tracks 133. Spring 134 yieldingly urges the unit away from the tape. A solenoid 135 has its operating coil connected in a parallel circuit with the main switch 136 for the drive motor 48, the arrangement being such that when the motor is started, the solenoid will be energized to move the heating unit 131 into heat exchanging relation with the tape. Conversely, when the motor is shut off, the solenoid will be deenergized, and its spring 134 will immediately effect retraction of the heater away from the tape.

It should be noted that when contact heaters are used, it is desirable to avoid heavy pressure between the tape and the heating surfaces in order to minimize wiping off of the adhesive material on the heaters. This result may be obtained in Fig. 6 with the solenoid 135 so selected as to power that it will bring the heater into only light contact with the tape, or the linkage 137 between the solenoid and heater may include a spring portion acting as a cushion. Similarly in Fig. 1, the pressure elements 42 and 43 are preferably mounted to bring the surface of the tape only into light wiping contact with heaters 40 and 41 to promote rapid heat exchange without depositing more than a thin film of adhesive on the heating surfaces.

Fig. 7 shows an arrangement similar to Fig. 6 wherein the tape is mounted for movement towards and away from the heating unit 140. The tape 33 runs from the supply roll 35 over a pair of guide rolls 141 to the feed rolls 36 and 37. The guide rolls are mounted on a linkage 142 supported for lateral movement by means of a rotary solenoid 145. The latter is suitably connected in the operating circuits for the apparatus so that when the motor is started, the linkage 142 will move to the right, as indicated in full lines in Fig. 7, and bring the tape into heat exchanging relation with the heating unit 140, and when the apparatus is stopped, the linkage and tape will move away from the heater to the position indicated in dotted lines.

In all of the above examples, the tape has been described as being fed with its coated surface in contact with the heat radiating surface of the heating elements, but the apparatus is not limited to such operating conditions. Satisfactory results have been obtained with the heat applied directly to the uncoated surface of the tape, particularly with tape having the thermoplastic adhesive material coated directly on a paper or cloth backing. However, adhesive tape of this character is also manufactured commercially which includes an asphaltic or other heat-sensitive layer in addition to the adhesive coating, and if heat sufficient to soften the adhesive is applied to the uncoated side of such tape, the other layer is also affected and tends to strike through the backing, giving nonuniform results.

Preferred results are accordingly obtained with both types of tape when the coated surface is in contact with the heating surfaces of contact heaters. Under these conditions, the movement of the tape across the heated surfaces of the heaters effects a continual deposit and removal of a thin film of adhesive which acts as a lubricant and is prevented from overheating by its continual renewal. However, when the apparatus stops, the residual heat in the heaters after the current has been shut off may be sufficient to char the deposited adhesive. With the above adhesive composition and under the above operating conditions, the deposited film appears to be vaporized and leaves the heating surfaces clean. With some adhesives, however, there is a tendency for the deposited film to burn, often with heavy smoking, to a layer of hard carbon, which in turn reduces the efficiency with which heat is transmitted to the tape, and it is therefore desirable in some cases to provide the heaters with a scraper for effecting continuous removal of this deposited film to prevent overheating thereof.

For this purpose the heater 150 in Fig. 8 is cylindrical and presents a continuous heating surface over which the tape 33 is guided by means of idler rolls 151 carried by retractable arms 152 pivoted at 153, the heating current being supplied to the periphery of the wheel through slip rings and brushes 154. A scraper 155 is mounted below this heating wheel in position to remove any deposited material from the surface of the heating wheel as the latter revolves, and a suitable receptacle 156 may be provided as shown. The desired rotation of the heater may be effected by the pull of the tape imparted by the feed rolls 36—37 and the pressure belts, or a separate belt drive may be provided as indicated at 157. The tape may be readily moved out of contact with heater 150 when the apparatus stops by swinging arms 152 away from the heater, rotary solenoids being suitable for this operation as described in connection with Fig. 7.

Fig. 9 shows another arrangement of heating mechanism wherein the heating element 160 is mounted for lateral reciprocating movement with respect to a scraper 161. The desired relative movement of these parts may be provided by means of a solenoid 165 which is so connected in the operating circuits of the machine as to move the heater 160 to the left as viewed in Fig. 9 in scraping contact with the scraper 161 when the apparatus stops, thus separating the heater from the web of tape 33, which is traveling at right angles to such movement of the heater, as well as removing any deposited film from the heater. Then when the apparatus is again set in motion, the solenoid will be deenergized and the heater will return laterally into heating contact with tape 33.

The use of electric contact heaters has been found practicable from the standpoint of adequately rapid softening of the adhesive with heaters of convenient size and economical power consumption. However, other types of heat sources have been used successfully in the practice of the invention, including radiant heat from electric or flame sources, direct flame heating and heating by means of a stream of hot air or other gas.

Fig. 10 shows an arrangement for applying softening heat to the adhesive coating on the tape by means of a gas flame source. The tape 33 is shown as passing with its coated surface in contact with the surface of a thin metal plate 170, the tape being guided in heat exchanging relation with the plate by the pair of rolls 171 and a further roll 172. The opposite surface of plate 170 is heated by a gas heater 173 providing a plurality of jet flames, the heater 173 being supplied by a pipe 174 controlled by a shutoff valve 175 operated by a solenoid 176. The heater 173 is also provided with a pilot flame 177 having a manual shutoff valve 178. The solenoid 176 may be connected in the operating circuits of the apparatus as already described in connection with Fig. 6 in such manner that the flames from heater 173 will be shut off as soon as the apparatus stops, and conversely gas will be supplied to the heater as soon as the apparatus is set in operation.

Fig. 11 shows a heating unit wherein the tape is heated by direct exposure to a gas flame. A flue 180 of sheet metal or other suitable material is open along the front thereof and is provided with an insulating jacket 181. A plurality of gas heaters 182 are mounted in vertically spaced relation within the flue, and the tape 33 is guided along the open side of the flue with its coated surface towards the flame by the rolls 183—184 and by the feed rolls 36—37 and the pressure belts as already described. With this arrangement, the tape itself effectively forms one side of the flue, with the flame being directed against its coated surface, and also the hot air and combustion gases traveling upwardly within the flue by convection effect further heating of the coating. Control of the flame may be readily provided by a solenoid operated valve as described in connection with Fig. 10. Satisfactory results have also been obtained utilizing electric radiant heaters in a similar way in place of the gas heaters 182.

Fig. 13 shows a modified arrangement of the apparatus wherein each of the blanks 20 to be sealed is passed in heat exchanging relation with an electric heating unit 190 before the tape is applied thereto. With this arrangement, the blank is heated until the surface to be sealed is at a temperature within or above the softening range of the adhesive, and the heat thus stored adjacent the surface serves to melt the adhesive and to effect the sealing when the tape meets the blanks at the pressure belts. The tape may be fed to its point of application to the blanks without being heated, or it may be subjected to preliminary heating, as indicated by the heater 191 positioned in advance of the feed rolls. With this arrangement, the tape may be warmed to a temperature not far below its softening range, thus requiring less heat transfer from the blank to effect the necessary softening and adhesion of the tape, but still leaving the surface with its coating sufficiently non-tacky that it will not deposit or offset until it comes in contact with the more highly heated surface of the blank.

Figs. 14 to 16 show a modified construction of feeding mechanism wherein a belt 200 is employed to aid in guiding the tape from the feed rolls to the cutoff knife. The upper feed roll 201 corresponds to feed roll 36 but is smoothly cylindrical. Belt 200 runs over roll 201 and a pair of idlers 202 and 203 carried by a frame 205 supported by an arm 206 extending from a collar 207 rotatably mounted on shaft 71, and this collar is biased by a spring 208 in a direction to urge idler 202 and belt 200 into contact with the upper surface of the tape. A tensioning roll 210 for belt 200 is similarly carried by an arm 211 extending from a collar 212 rotatable on shaft 71 and provided with a biasing spring 213.

With this construction, the idler 202 and belt 200 press the tape towards the lower knife 45, and in order to support the tape from below, a guide member 215 is used which includes a finger portion similar to the guide finger 83 (Figs. 4 and 5) and a three-pronged fork portion which extends forwardly to knife 45. In addition, a bar 216 is mounted on the frame 205 and extends forwardly just short of knife 44 and downwardly just short of the upper surface of the tape to form an abutment effective to strip the leading end of the tape from knife 44 if the tape tends to stick to the knife as the latter rises from its cutting stroke. The provision of a heater 217 for knife 44 is also useful in minimizing the tendency of the adhesive to chill on the knife and cause the tape to stick thereto. It will also be noted that the stripper 216 and the belt 200 effectively fill the space between the feed rolls and the knife 44 into which the tape might otherwise buckle or loop, thus further promoting accurate feeding.

If belt 200 is somewhat narrower than the tape 33 as shown in Fig. 15, there is a substantially reduced tendency for adhesive to be transferred to the belt from the side edges of the tape. However, if some of the heated adhesive should be deposited on the outer surface of the belt, it will then be transferred to tensioning roll 210, since the latter is at a relatively lower temperature. Accordingly, a scraper 220 may be mounted in contact with roll 210, as by means of the arm 211, at such an angle, as shown in Fig. 15, as to effect constant cleaning of the roll, with the scrapings being discharged at the outer end of the roll. It will also be noted that since belt 200 runs between the tape and the feed roll 201, it spaces the tape from the surface of the feed roll to minimize the possibility of deposit of adhesive thereon.

The use of thermoplastic adhesive tape applied while the thermoplastic is adequately tacky as described offers substantial advantages from the standpoint of wet strength in the finished product as well as speed of production. Thermoplastic adhesives, such as those of the above type, may be of such characteristics as to be highly tacky at temperature ranges of application, such as the temperatures provided by the forms of apparatus as above set out, and also they may be of such character as to set with great rapidity, as after application to the blanks. This is particularly advantageous in application, such as with blanks of the kind herein wherein the panels, or parts thereof, being taped together have considerable tendency to separate or spring apart. Such blanks have a tendency to pull away or separate from the tape unless it is adequately set before pressure is removed; this being a well known limitation in the use of tapes using water soluble glues. As a result of the present invention and the forms of apparatus and methods thereof, the invention presents greatly accelerated production since the thermoplastic such as described revert so quickly in use as to require the application of sealing pressure for so short a period that the apparatus can be operated at correspondingly high speeds. Also this invention provides the advantages of a mold and fungi resistant joint, waterproof tape joint, no troubles from improper moistening of the tape, and the above referred slow setting due to water soluble glue, with the advantage of higher rate of production speed.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. Apparatus for applying tape having a thermoplastic adhesive coating from a continuous supply thereof to successive articles to be sealed comprising means for supporting said supply, means for feeding a web of said tape from said supply, a heat source, means for guiding said tape with said coated surface thereof in heat exchanging relation with said heat source to soften said coating, means for reducing the heat applied to said tape to prevent overheating of said coating upon interruption of the operation of said feeding means, means for periodically severing predetermined lengths from the leading end of said tape in accordance with the lengths of said articles to be sealed, and means for pressing said lengths of tape into sealing relation with successive said articles.

2. Apparatus for applying tape having a thermoplastic adhesive coating from a continuous supply thereof to successive articles to be sealed comprising means for supporting said supply, means for feeding a web of said tape from said supply, means intermediate said supply and said feeding means for rapidly heating said tape during the travel of said web to soften said coating thereon, means for guiding said heated tape into sealing relation with successive said articles, means for periodically severing predetermined lengths from the leading end of said tape for application to said successive articles, and means for inhibiting deposit of heated adhesive material from said tape on said feeding and severing means.

3. Apparatus for applying tape having a thermoplastic adhesive coating from a continuous supply thereof to successive articles to be sealed comprising means for supporting said supply, means for feeding a web of said tape from said supply, means intermediate said supply and said feeding means for heating said tape to soften said coating thereon, means for guiding said heated tape into sealing relation with successive said articles, means for periodically severing predetermined lengths from the leading end of said tape for application to said successive articles, and means for heating said feeding and severing means to inhibit deposit of heated adhesive material thereon from said tape.

4. Apparatus for applying tape having a thermoplastic adhesive coating from a continuous supply thereof to successive articles to be sealed comprising means for supporting said supply, means for feeding a web of tape from said supply, a heat source, means for guiding said web of tape into heat exchanging relation with said heat source to soften said coating thereon, means for periodically severing predetermined lengths of said heated tape from the leading end of said web in accordance with the lengths of said articles to be sealed, means for applying said lengths of tape to successive said articles while said coating is soft, and means responsive to interruption of the operation of said feeding means for thereupon reducing the heat applied to said tape by said heat source to prevent over-heating of said coating.

5. Apparatus for applying tape having a thermoplastic adhesive coating from a continuous supply thereof to successive articles to be sealed comprising means for feeding a web of said tape from said supply, a heater having a heat-radiating surface maintained at a temperature above the softening point of said coating, means for guiding said coated surface of said web into contact with said heat-radiating surface to soften said coating, means for periodically severing predetermined lengths of said heated tape from the leading end of said web in accordance with the lengths of said articles to be sealed, means for applying said lengths of tape to successive said articles while said adhesive coating is soft, and means responsive to interruption of the operation of said feeding means for promptly effecting relative separation of said tape and said heat-radiating surface to prevent overheating.

6. Apparatus for applying tape having a thermoplastic adhesive coating from a continuous supply thereof to successive articles to be sealed comprising means for feeding a web of said tape from said supply, a heater having a heat-radiating surface maintained at a temperature above the softening point of said coating, means for guiding said coated surface of said web into contact with said heat-radiating surface to soften said coating, a scraper associated with said heat-radiating surface, and means for effecting relative movement of said scraper and said heat-radiating surface to remove from said surface adhesive material transferred thereto from said tape.

7. Apparatus for applying tape having a thermoplastic adhesive coating from a continuous supply thereof to successive articles to be sealed comprising means for supporting said supply, a heater having a continuous heat-radiating surface, means for feeding a web of said tape from said supply with the coated surface thereof in contact with said heat-radiating surface, means for rotating said heat radiating surface, and a scraper mounted in contact with said heat-radiating surface for removing therefrom adhesive material transferred thereto from said tape.

8. Apparatus for applying tape having a thermoplastic adhesive coating from a continuous supply thereof to successive articles to be sealed comprising means for supporting said supply of tape, a heater having a heating surface, means for feeding said tape from said supply with the coated surface thereof in contact with said heating surface, means for scraping said heating surface, and means for effecting relative reciprocation of said heating surface and said scraping means to remove from said surface adhesive material deposited thereon from said tape.

9. Apparatus for applying tape having a thermoplastic adhesive coating from a continuous supply thereof to successive articles to be sealed comprising means for supporting said supply of tape, means for intermittently feeding said tape from said supply to a predetermined application point, means for conveying successive said articles to said application point, a plurality of heat sources intermediate said tape supply and said application point, means for guiding said tape into heat exchanging relation with said heat sources, and means for selectively controlling the temperatures of said heat sources to effect substantially uniform softening of said coating lengthwise of said tape at said application point.

10. Apparatus for applying tape having a thermoplastic adhesive coating from a continuous supply thereof to successive articles to be sealed comprising means for supporting said tape supply, means for heating said coating to soften the same, means for periodically severing a length from the leading end of said tape, means intermediate said heating means and said severing means for feeding said heated tape to said severing means, and means for imparting a generally bowed cross-sectional configuration to the portion of said tape intermediate said feeding means and said severing means to stiffen the same.

11. Apparatus for applying tape having a thermoplastic adhesive coating from a continuous supply thereof to successive articles to be sealed comprising means for supporting said tape supply, means for feeding a web of said tape from said supply, and means intermediate said feeding means and said tape supply for heating said coating on said web to soften the same, said feeding means including a pair of rolls cooperating to grip said web therebetween, said rolls having complementary circumferential tongue and groove portions for imparting a generally bowed cross-sectional configuration to the tape passing therethrough.

12. Apparatus for applying tape having a thermoplastic adhesive coating from a supply thereof to successive articles to be sealed comprising means for feeding a web of tape from said supply, means for heating the coating on said web to soften the same, means for periodically severing predetermined lengths from the leading end of said web of tape, said feeding means including cooperating pressure rolls spaced ahead of said severing means, an idler roll adjacent said severing means, and a belt carried by said idler roll and one of said pressure rolls for engaging the uncoated surface of said web to guide said web from said pressure rolls to said severing means.

13. Apparatus for applying tape having a thermoplastic adhesive coating from a supply thereof to successive articles to be sealed comprising means including a stationary and a movable blade forming shears for severing said tape, cooperating pressure rolls for feeding a web of said tape from said supply to said shears, a roller positioned adjacent said movable blade on the opposite side of said tape from said stationary blade, a belt carried by said roller and one of said pressure rolls for engaging the surface of said web to guide said web to said shears, means resiliently urging said belt toward said stationary blade to hold said tape in close relation with said stationary blade, and an abutment mounted between said belt and said movable blade to strip the leading end of said web from said movable blade on the return stroke thereof.

14. Apparatus for applying tape having a thermoplastic adhesive coating from a supply thereof to successive articles to be sealed comprising means for feeding a web of said tape from said supply, means for heating the coating on said tape to soften the same, means for severing predetermined lengths from the leading end of said web, said feeding means including cooperating pressure rolls spaced ahead of said severing means, an idler roll adjacent said severing means, a belt carried by said idler roll and one of said pressure rolls for engaging the uncoated surface of said web to guide said web from said pressure rolls to said severing means, a tensioning roller mounted in contact with the outer surface of said belt, and a scraper mounted in contact with said tensioning roller to remove therefrom adhesive material transferred thereto from said belt.

15. A method of applying tape having a thermoplastic coating from a continuous supply thereof to successive articles to be sealed which comprises subjecting the coating on said tape to a temperature substantially higher than the softening range thereof while feeding said tape at a speed sufficient to effect softening of successive areas of said coating without charring or burning, guiding said heated tape into sealing contact with successive said articles, periodically severing the leading end of said tape in accordance with the length of said articles to be sealed, causing said tape to dwell intermediate the application thereof to successive said articles, and maintaining said temperature within a range correlated with the softening range of said coating to prevent charring or burning of the portion of said coating subjected to said temperature during each said dwell.

16. A method of applying tape having a thermoplastic coating from a continuous supply thereof to successive articles to be sealed which comprises feeding a web of tape from said supply thereof, heating said coating while said web is feeding to soften said coating, warping the leading end of said heated web longitudinally thereof to impart stiffness thereto, projecting said warped leading end of said web into sealing contact with each successive said article, and periodically severing predetermined lengths from said warped web.

17. A method of applying tape having a thermoplastic adhesive coating from a continuous supply thereof to successive articles to be sealed which comprises feeding said tape from said supply, applying heat directly to said coating while said tape is feeding to soften said coating, guiding said heated tape by contact primarily with the uncoated surface thereof into sealing relation with successive said articles to be sealed, and periodically severing said heated tape to leave a predetermined length thereof on each said article.

18. A method of applying tape having a thermoplastic adhesive coating from a continuous supply thereof to successive articles to be sealed which comprises feeding said tape from said supply, heating the surface of successive said articles to be sealed to a temperature sufficient to soften said coating, pressing said tape into contact with said heated surface of each successive said article to effect softening and adhesion of said coating thereon, and periodically severing said tape to leave a predetermined length thereof on each said article.

19. A method of applying tape having a thermoplastic adhesive coating from a continuous supply thereof to successive articles to be sealed which comprises feeding said tape from said supply, heating the surface of successive said articles to be sealed to a temperature sufficient to soften said coating, warming said tape to a temperature insufficient to effect complete softening of said coating, pressing said warmed tape into contact with said heated surface of each successive said article to effect softening and adhesion of said coating thereon, and periodically severing said tape to leave a predetermined length thereof on each said article.

20. A method of applying tape having a thermoplastic adhesive coating from a continuous supply thereof to successive articles to be sealed which comprises pressing the coated surface of a web of said tape into wiping contact with a heated surface to soften said coating while feeding said web from said supply at a speed sufficient to prevent charring or burning of said coating, guiding said heated web from said heated surface into sealing contact with successive said articles, and periodically severing the leading end of said heated web in accordance with the length of said articles to be sealed.

21. A method of applying tape having a thermoplastic adhesive coating from a continuous supply thereof to successive articles to be sealed which comprises feeding a traveling web of tape from said supply, heating said traveling web to a temperature sufficient to soften the coating thereon, engaging the coated surface of said heated web to cause the forward feeding thereof, supplying additional heat at the zone of engagement with said web to minimize deposit of coating thereat, and thereafter applying predetermined lengths of said heated web to successive articles to be sealed.

22. A method of applying tape having a thermoplastic adhesive coating from a continuous supply thereof to successive articles to be sealed which comprises pressing said coated surface of a web of said tape into wiping contact with a heated surface to soften said coating while feeding said web at a speed sufficient to maintain a thin film of said adhesive on said surface, guiding said heated web from said heated surface into sealing contact with successive said articles, separating said heated surface and said web when said feeding of said tape is interrupted, and maintaining said heated surface at a temperature sufficiently higher than the softening range of said coating to effect substantial vaporization of said deposited film when said web and surface are separated.

FREDERICK W. HOLT, Jr.
CHARLES F. HOWARD.
DAVID E. BENCH.

REFERENCES CITED

The following references are of record in the file of this patent:

UNITED STATES PATENTS

| Number | Name | Date |
|---|---|---|
| 1,443,784 | Black | Jan. 30, 1923 |
| 2,123,415 | Gorbatenko | July 12, 1938 |
| 2,129,686 | Gray | Sept. 13, 1938 |
| 2,159,993 | Krueger | May 30, 1939 |
| 2,248,744 | Cohen | July 8, 1941 |
| 2,435,267 | Cahn | Feb. 3, 1948 |
| 2,449,298 | Hoppe | Sept. 14, 1948 |